B. H. G. WILBUR.
COMBINED PLOW AND HARROW.
APPLICATION FILED AUG. 28, 1911.
1,018,856.
Patented Feb. 27, 1912.
2 SHEETS—SHEET 1.
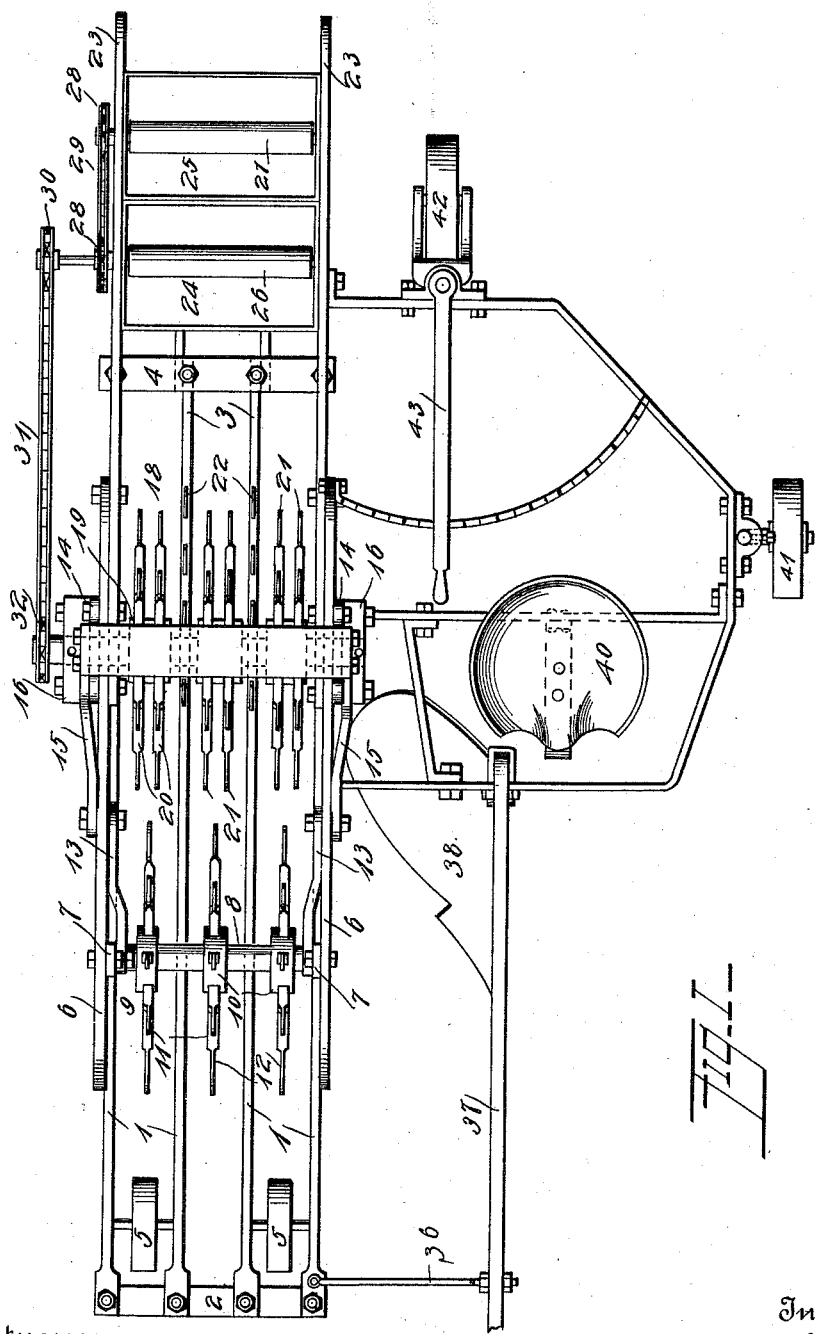

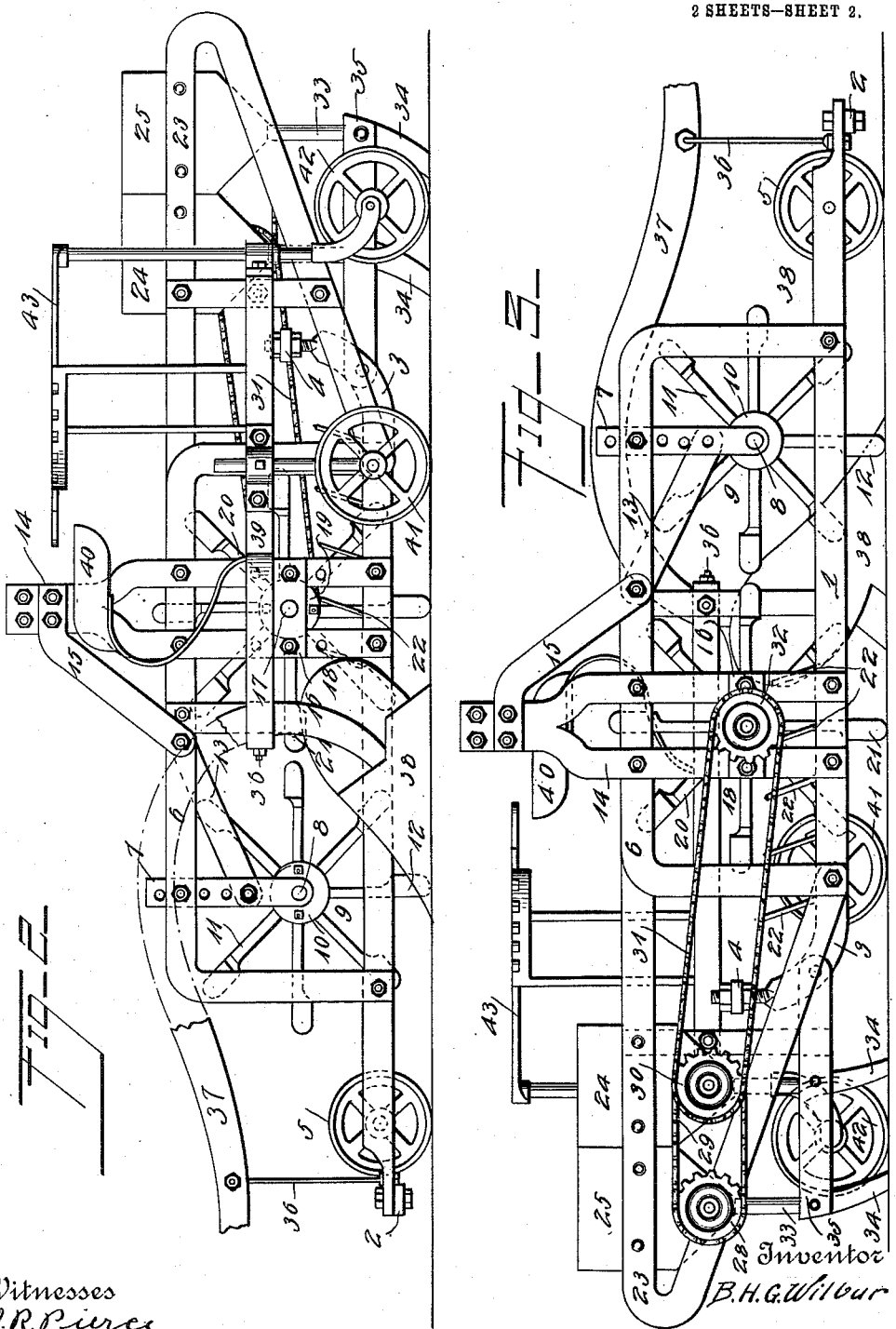

UNITED STATES PATENT OFFICE.

BELDEN H. G. WILBUR, OF COLORADO SPRINGS, COLORADO, ASSIGNOR OF ONE-THIRD TO GEORGE S. ELSTUN, OF COLORADO SPRINGS, COLORADO.

COMBINED PLOW AND HARROW.

1,018,856.      Specification of Letters Patent.      Patented Feb. 27, 1912.

Application filed August 28, 1911. Serial No. 646,401.

*To all whom it may concern:*

Be it known that I, BELDEN H. G. WILBUR, citizen of the United States, residing at Colorado Springs, in the county of El Paso and State of Colorado, have invented certain new and useful Improvements in a Combined Plow and Harrow; and I do declare the following to be a full, clear, and exact description of the invention, such as will enable others skilled in the art to which it appertains to make and use the same.

This invention relates to improvements in combined plows and harrows.

One object of the invention is to provide a harrow adapted to be attached to any style of riding or walking plow whereby the soil turned by the plow will be thoroughly pulverized and prepared for seeding simultaneously with the plowing operation.

Another object is to provide a combined plow and harrow having operatively connected therewith a seeding and pulverizing mechanism whereby seed and fertilizer may be distributed simultaneously with the plowing and cultivating operation.

With these and other objects in view the invention consists of certain novel features of construction, and the combination and arrangement of parts as will be more fully described and claimed.

In the accompanying drawings: Figure 1 is a plan view of a combined plow and harrow constructed and arranged in accordance with my invention; Fig. 2 is a side view of one side thereof; Fig. 3 is a similar view of the opposite side.

In the embodiment of the invention I provide a main supporting frame comprising a series of parallel longitudinally disposed bars 1 which are connected together at their forward ends by a front cross bar 2 and have their rear ends curved upwardly as shown at 3 and connected by a cross bar 4. Between the outer and the next adjacent bars 1 near the forward ends thereof are revolubly mounted supporting wheels 5 which are adapted to travel on the ground and support the front end of the harrow. Bolted to the outer bars 1 are longitudinally disposed arched bars 6 to which near their forward ends are adjustably bolted depending hanger bars 7 in the lower ends of which is revolubly mounted the shaft 8 of a front revolving harrow 9, said revolving harrow comprising a series of hubs 10 fixedly mounted on the shaft 8 and having projecting radially therefrom a plurality of harrow arms or bars 11 the outer ends of which are preferably flattened to form teeth or blades 12 which, when the harrow is drawn along engage the soil and perform the preliminary work of harrowing or pulverizing the same. The hanger bars 7 are firmly held in position by inclined brace bars 13 which are bolted thereto and to the side bars 6 as shown.

Bolted or otherwise secured to the outer sides of the outer frame bars 1 and the arch bars 6 at a suitable distance in rear of the front harrow are vertically disposed standards or uprights 14 the lower portions of which are preferably bifurcated or formed of parallel bars as shown. The upper ends of the standards project a suitable distance above the bars 6 and said upper ends of the standards are firmly braced by inclined brace bars 15 secured thereto and to the arch bars 6. Adjustably secured to the standards 14 are journal boxes 16 in which is revolubly mounted the shaft 17 of a rear rotary harrow 18, said harrow comprising a series of hubs 19 which are fixedly mounted on the shaft and have arranged thereon a plurality of radially projecting harrow arms or bars 20, said bars being arranged in pairs or in double rows around the hubs. The arms or bars 20 are disposed in such position with respect to the front harrow 9 as to operate in planes adjacent to each side of the planes in which the arms or bars 11 of the front harrow operate. The outer ends of the arms or bars 20 are flattened to form teeth or blades 21 which as the harrow is drawn along, engage the ground or soil turned by the plow as will be hereinafter more fully described. The arms or bars 11 of the front harrow and the arms or bars 20 of the rear harrow revolve between the bars 1 of the main frame of the harrow and on the upper edges of the rear portion of said bars 1 between the arms of the harrow 18 are arranged upwardly projecting rearwardly inclined harrow teeth 22 which materially assist the arms or bars of the rotary harrows in breaking up and finely pulverizing the soil.

Arranged in the rear of the harrow mechanism is a seed and fertilizer distributing mechanism, said mechanism comprising substantially V shaped side frames 23 the upper bars of which are bolted to the inner sides of the upper portion of the arch bars 6 and the forward ends of the lower bars of the frames 23 are bolted to the outer bars 1 of the main frame. Secured between the upper bars of the frames 23 are seed and fertilizer distributing hoppers 24 and 25 having inclined bottoms in which are revolubly mounted seed and fertilizer discharging rollers 26 and 27. On one end of the shafts of the rollers 26 and 27 are fixedly mounted sprocket gears 28 which are operatively connected together by a sprocket chain 29 whereby said rollers are turned in unison. The shaft of the roller 26 is extended at one end and has fixedly mounted thereon a sprocket gear 30 which is connected by a sprocket chain 31 to a sprocket gear 32 fixed on the projecting end of the shaft 17 of the rear harrow whereby the rotary movement of said harrow is imparted to the roller 26 and from the same by the gears 28 and sprocket chain 29 to the roller 27 of the adjoining hopper. The hoppers 24 and 25 are connected by flexible seed and fertilizer conducting tubes 33 with drill tubes or furrow opening plows 34 which are secured to beams 35 connected at their inner ends to the rear ends of the bars 1 of the main frame as shown.

My improved harrow and seed distributing mechanism may be connected in any suitable manner to any form of walking or riding plow and is here shown as being connected by suitable connecting and bracing bars 36 to the beam 37 of a plow 38. The harrow when thus connected to the plow is arranged in such position that the soil when turned by the plow will be thrown onto the bars 1 of the main frame immediately in front of the harrow 18 which will immediately act upon the soil, thus turned. As the harrow is drawn along the soil is further acted upon by the harrow teeth 22 on the adjacent portion of the frame bars 1. In the present instance the harrow is shown as having connected thereto a seat supporting frame 39 which also forms part of the plow attaching mechanism and has arranged thereon a driver's seat 40. The frame 39 has arranged on the outer side thereof a side supporting wheel 41 and at the rear end thereof is provided with a pivotally mounted steering or caster wheel 42 the standard of which is provided with a hand lever 43 arranged in convenient reach of the driver whereby the caster wheel may be turned to steer the rear end of the harrow in the desired direction.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In a combined plow and harrow, a harrow frame comprising a series of longitudinal bars, harrow teeth arranged in said bars, a front rotary harrow adjustably mounted above the front portion of said harrow frame, a rear rotary harrow adjustably mounted above said harrow frame and in rear of said front harrow, said harrows being adapted to coöperate with the bars of the harrow frame, and means to secure said harrow frame to the plow in position to receive the soil turned up thereby.

2. In a combined plow and harrow, a harrow frame comprising a series of parallel longitudinally disposed harrow bars, supporting wheels revolubly mounted in the forward ends of said bars, a series of harrow teeth arranged on the rear ends of the bars, means to attach said harrow frame to the plow in position to receive the soil turned thereby, side frames secured to said bars, a front rotary harrow adjustably mounted in said frames, harrow supporting standards secured to said harrow bars and side frames, a rear rotary harrow adjustably supported by said standards, said rotary harrows comprising shafts, hubs fixed on said shafts, a plurality of radial harrow arms secured to said hubs and adapted to co-act with said harrow bars to pulverize the soil thrown thereon.

3. In a combined plow and harrow, a frame comprising a series of longitudinally disposed harrow bars, harrow teeth arranged on said bars, rotary harrow supporting frames secured to said bars, hangers adjustably secured to the front portion of said frames, a front rotary harrow revolubly mounted in said hangers, harrow supporting standards secured to the rear ends of said frames and harrow bars, a rear rotary harrow revolubly mounted in said standards, said rotary harrows comprising shafts, and hubs fixedly mounted on said shafts, a series of radially projecting arms secured to said hubs and adapted to co-act with said harrow bars to pulverize the soil thrown thereon.

4. In a combined plow and harrow, a harrow frame comprising a series of bars, harrow teeth arranged in said bars, a rotary harrow adjustably mounted in said harrow frame, said harrow being adapted to coöperate with the bars of the harrow frame, and means to secure said harrow frame to the plow, in position to receive the soil turned up thereby.

In testimony whereof I have hereunto set my hand in presence of two subscribing witnesses.

BELDEN H. G. WILBUR.

Witnesses:
 FRED VAN HORN,
 CHARLES H. FALK.

---

Copies of this patent may be obtained for five cents each, by addressing the "Commissioner of Patents, Washington, D. C."